(12) United States Patent
Tollis et al.

(10) Patent No.: US 11,182,430 B2
(45) Date of Patent: Nov. 23, 2021

(54) LOW INK DRAWINGS OF DENSE GRAPHS

(71) Applicants: Ioannis Tollis, Heraklion (GR); Brendan Madden, Berkeley, CA (US)

(72) Inventors: Ioannis Tollis, Heraklion (GR); Brendan Madden, Berkeley, CA (US)

(73) Assignee: Tom Sawyer Software, Oakland, CA (US)

( * ) Notice: Subject to any disclaimer, the term of this patent is extended or adjusted under 35 U.S.C. 154(b) by 0 days.

(21) Appl. No.: 16/431,856

(22) Filed: Jun. 5, 2019

(65) Prior Publication Data
US 2020/0387546 A1 Dec. 10, 2020

(51) Int. Cl.
*G06F 16/901* (2019.01)
*G06F 16/904* (2019.01)
*G06T 11/20* (2006.01)

(52) U.S. Cl.
CPC ........ *G06F 16/9024* (2019.01); *G06F 16/904* (2019.01); *G06T 11/206* (2013.01)

(58) Field of Classification Search
CPC ... G06F 16/9024; G06F 16/904; G06T 11/206
See application file for complete search history.

(56) References Cited

U.S. PATENT DOCUMENTS

2018/0181615 A1* 6/2018 Asher ................ G06F 16/2453

* cited by examiner

*Primary Examiner* — Truong V Vo
(74) *Attorney, Agent, or Firm* — Useful Arts IP

(57) ABSTRACT

A computer-implemented method of drawing an undirected graph in which multiple nodes are connected by multiple edges is provided using a computer system in which a computer is coupled to the computer display. The computer includes a processor and memory. A representation is received of a graph having multiple nodes and multiple edges, in which positions of the nodes relative to one another have been previously determined. The representation is modified so as to: 1) preserve the positions of the nodes relative to one another; and 2) simplify the visual representation of the graph by sharing drawn lines between different distinct edges in such a way as to enable the different distinct edges, despite such sharing, to still be recognized by a user. In one embodiment, the processor places the nodes in unique positions with integer coordinates.

18 Claims, 11 Drawing Sheets

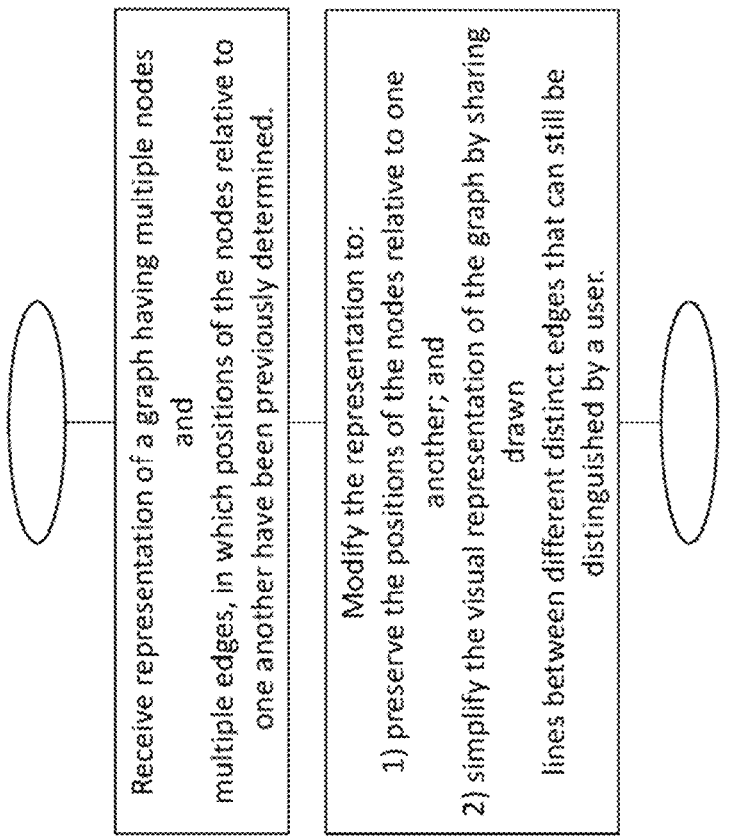

LOW INK DRAWINGS OF DENSE GRAPHS

BACKGROUND

Dense graphs present tremendous challenges to most graph drawing methods. For example, in straight-line force-directed graph drawing methods, it is common to tolerate potential overlaps between nodes and edges. The likelihood of overlap increases significantly with the density of the input graph. In fact, such drawings of dense graphs are often referred to as "a ball of yarn" or a "hairball". One can immediately observe by the example shown in FIG. 1, straight-line drawings of dense graphs have the following immediate drawbacks:

1. Edges running over nodes obstruct their names or other information represented inside the nodes.
2. The drawing space is dominated by the myriad of edge segments, many of which run very close together (or overlap), creating a lot of ambiguity. For example, it is nearly impossible to tell from FIG. 1 if the highlighted nodes are connected or not, especially considering that this is a zoomed-in picture.
3. If there is information you would like to display on the edges, such as labels, the labeling problem becomes very difficult, and the labels will probably overlap many edges.

In some other graph drawing styles, these problems are alleviated by routing (bending) edges around nodes using orthogonal or arbitrary polyline routes, as seen in FIGS. 2 and 3. While such edge routing approaches solve the first of the above problems, individual edges may still be hard to follow if they are long or have many bend points. For the layered drawing in FIG. 3, this task is even more daunting because of the arbitrarily sharp angles at which the edges may meet at a common node or cross. This problem is referred to as the "angle resolution" problem.

The readability problems are particularly severe at high-degree nodes, namely, nodes with many incident (attached) edges. For the orthogonal drawing styles, high-degree nodes cause yet another problem, as it is not possible to ensure some fixed minimum separation of incident edges without enlarging the nodes or without having some kind of a virtual box method around a smaller node. Thus we may end up with nodes of enormous size (FIG. 4A) or need to break away from the strict orthogonality of edges (FIG. 4B).

The low ink graph drawing approach and methods address these problems.

BRIEF DESCRIPTION OF THE DRAWING FIGURES

The present invention may be understood from the following detailed description in conjunction with the appended drawing figures. In the drawing:

FIG. 10 is a flow chart showing graph drawing steps in accordance with present methods.

DETAILED DESCRIPTION

Summary

Figure 1:
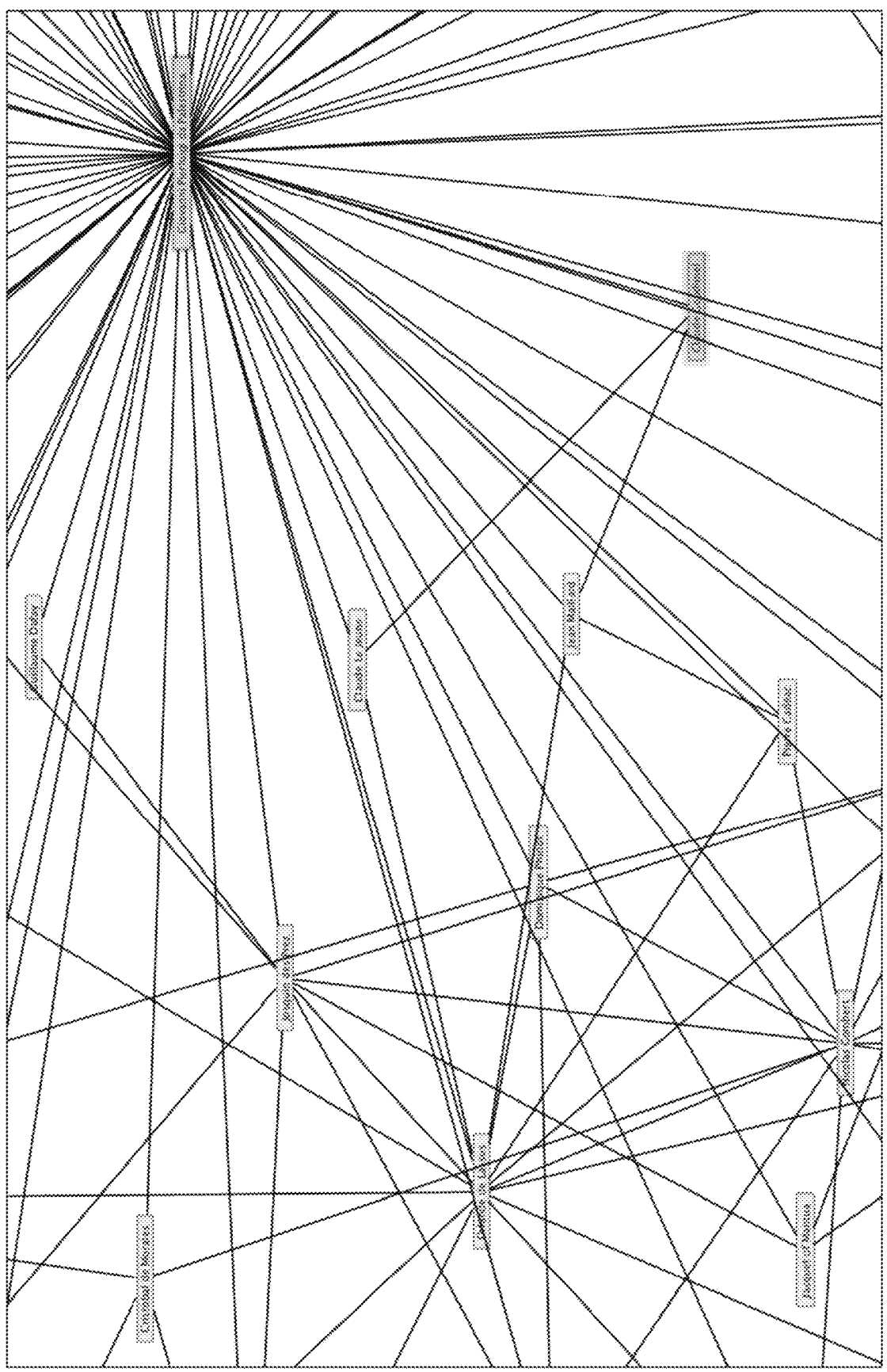
FIG. 1 is an example showing a zoomed-in straight-line drawing of a dense graph.

A computer-implemented method of drawing an undirected graph in which multiple nodes are connected by multiple edges is provided using a computer system in which a computer is coupled to the computer display. The computer includes a processor and memory. A representation is received of a graph having multiple nodes and multiple edges, in which positions of the nodes relative to one another have been previously determined. The representation is modified so as to: 1) preserve the positions of the nodes relative to one another; and 2) simplify the visual representation of the graph by sharing drawn lines between different distinct edges in such a way as to enable the different distinct edges, despite such sharing, to continue to be recognized by a user. In one embodiment, the processor places the nodes in unique positions with integer coordinates.

The word "ink" is used herein to mean either physical ink in accordance with a hard copy of a graph drawing, or virtual ink, in accordance with display representations.

Description

In one embodiment, the present low-ink graph drawing approach reduces the visual complexity of the large number of edges by sharing large portions of their paths, and yet ensure the unambiguity of the connectivity information using very simple edge routes consisting of precisely one horizontal and one vertical line segment.

For purposes of description, let $G=(V,E)$ be an input undirected graph to be laid out. This may be accomplished according to these steps:

1. Initial Node Placement. Start with arbitrary initial node positions $x_0(v)$, $y_0(v)$, $v \in V$. For example, any force-directed graph layout method can be used for the initial node placement. For massive graphs, it may be practical to devise a linear time algorithm attempting to place neighboring nodes close together. However, the following steps work for any placement of the nodes by any graph drawing algorithm.
2. Grid Coordinates. Sort the nodes by $x_0(v)$ and assign the rank of each node $v \in V$ in the sorted list as its unique integer coordinate $x(v) \in \{1 \ldots |V|\}$. The vertical integer coordinates $y(v)$ are derived similarly.

3. Edge Routing. Route each edge $(u, v) \in E$ using precisely one bend point. Assuming that $y(u) < y(v)$, the bend point is placed at the coordinate $(x(u), y(v))$, thus the edge path consists of a vertical line segment from $(x(u), y(u))$ to $(x(u), y(v))$ and a horizontal line segment from $(x(u), y(v))$ to $(x(v), y(v))$ (see FIG. 5A). One can think of the edge as going upwards from the lower of the two nodes and bending left or right towards the upper node. Notice that all edges starting at a common lower node u share the same column in the drawing. Similarly, all edges terminating at a common upper node v share the same row in the drawing.

Figure 5B:
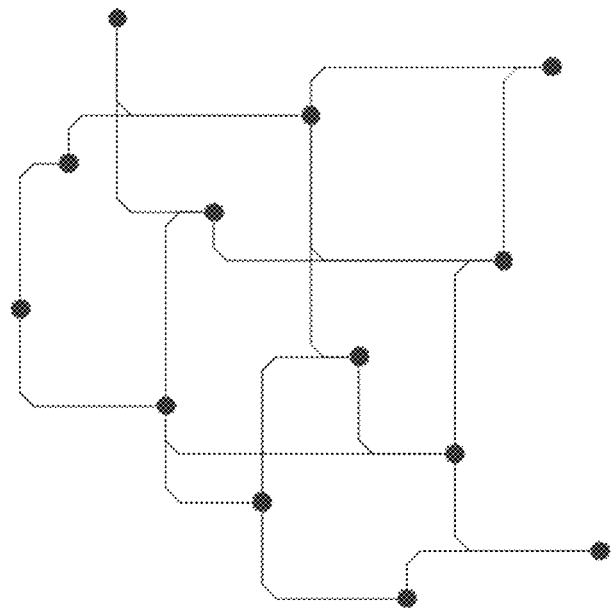
FIG. 5B is a graph drawing like that of FIG. 5A but with bend points represented by short line segments at 45 degrees.
Figure 5A:
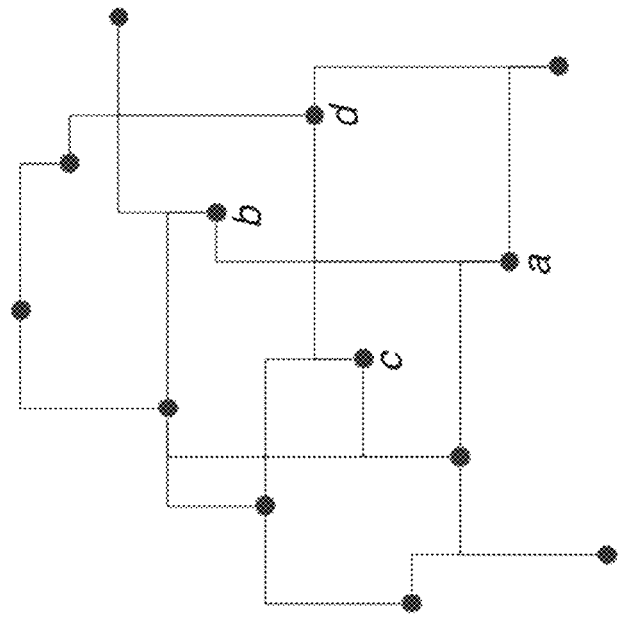
FIG. 5A is an example of an undirected graph drawn in accordance with present methods with nodes assigned to grid points and edges routed with one bend point according to steps described herein.

4. Bend Representation. At this stage, the drawing is remarkably ambiguous as many edges are overlapping. For example, it is not possible to tell if the nodes a and d in FIG. 5A are connected because the potential bend point coincides with the crossing between edges (a, b) and (c, d). To resolve this ambiguity, the bend points need to be represented graphically by, say, short line segments of 45 degrees as in FIG. 5B or small left or right arcs.

5. Compaction. The area of drawings produced by the above steps is $\Omega(|V|^2)$, which may be impractical for large graphs. In this step, the drawing is compacted by moving nodes horizontally and vertically (together with the attached edge segments) with the aim to reduce the total edge length and the area while maintaining the overall shape of the drawing. Any efficient compaction technique can be used as long as it satisfies the following conditions:

No edge shares a point with nodes other than its end nodes,

No two edges have a common point unless they share a common end node or cross each other.

Figure 6:
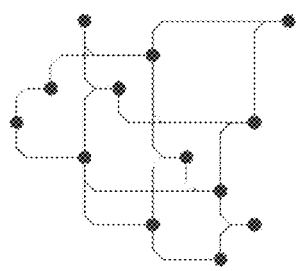
FIG. 6 is a graph drawing like that of FIG. 5B but with a compaction step applied.

FIG. 6 shows the same drawing as in FIG. 5 with the compaction step applied. Note that several nodes can share the same row or column in such a compacted drawing, and yet the connectivity information can still be clearly recognized.

Figure 2:
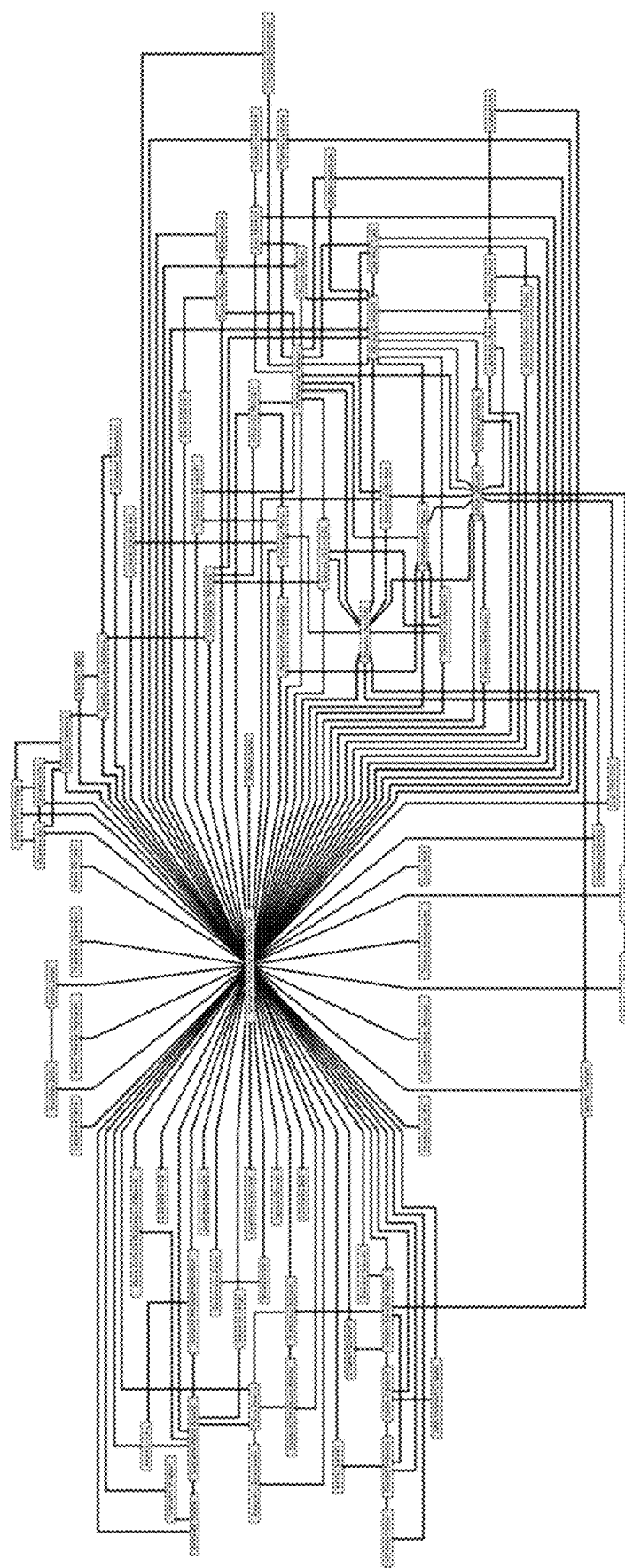
FIG. 2 is an example showing a quasi-orthogonal drawing of the dense graph of FIG. 1.
Figure 3:
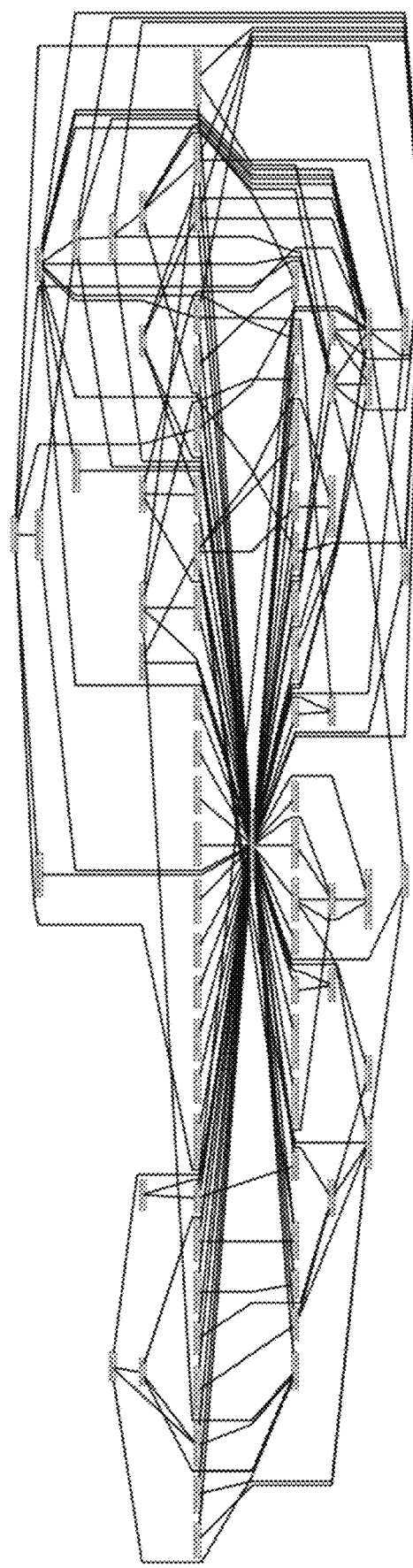
FIG. 3 is an example showing a layered drawing of the dense graph of FIG. 1 using polyline edge routes.
Figure 4A:
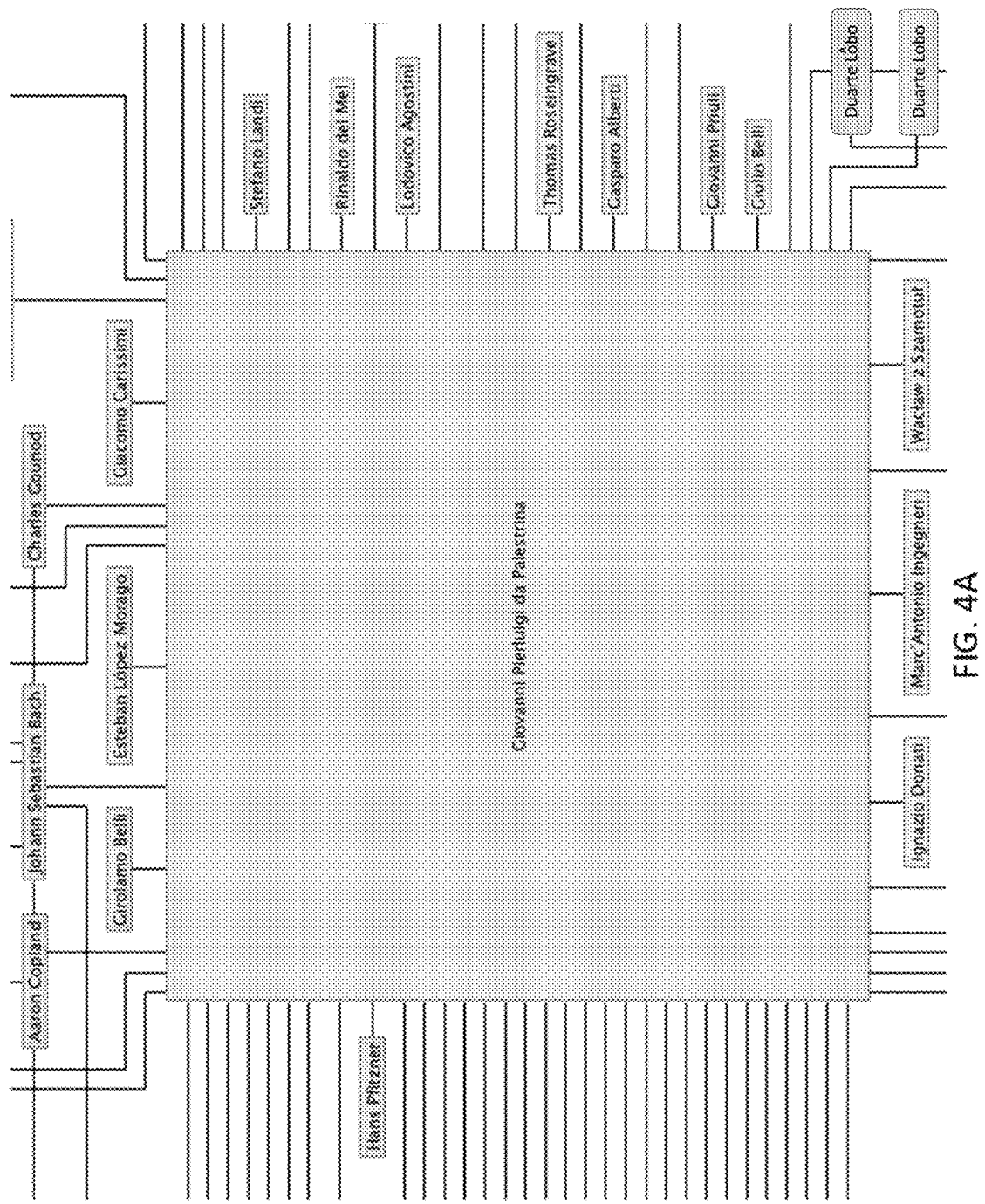
FIG. 4A is an example showing a portion of an orthogonal graph drawing surrounding a high-degree node, wherein resizing of the node has been used to ensure a minimum separation between the incident edges.
Figure 4B:
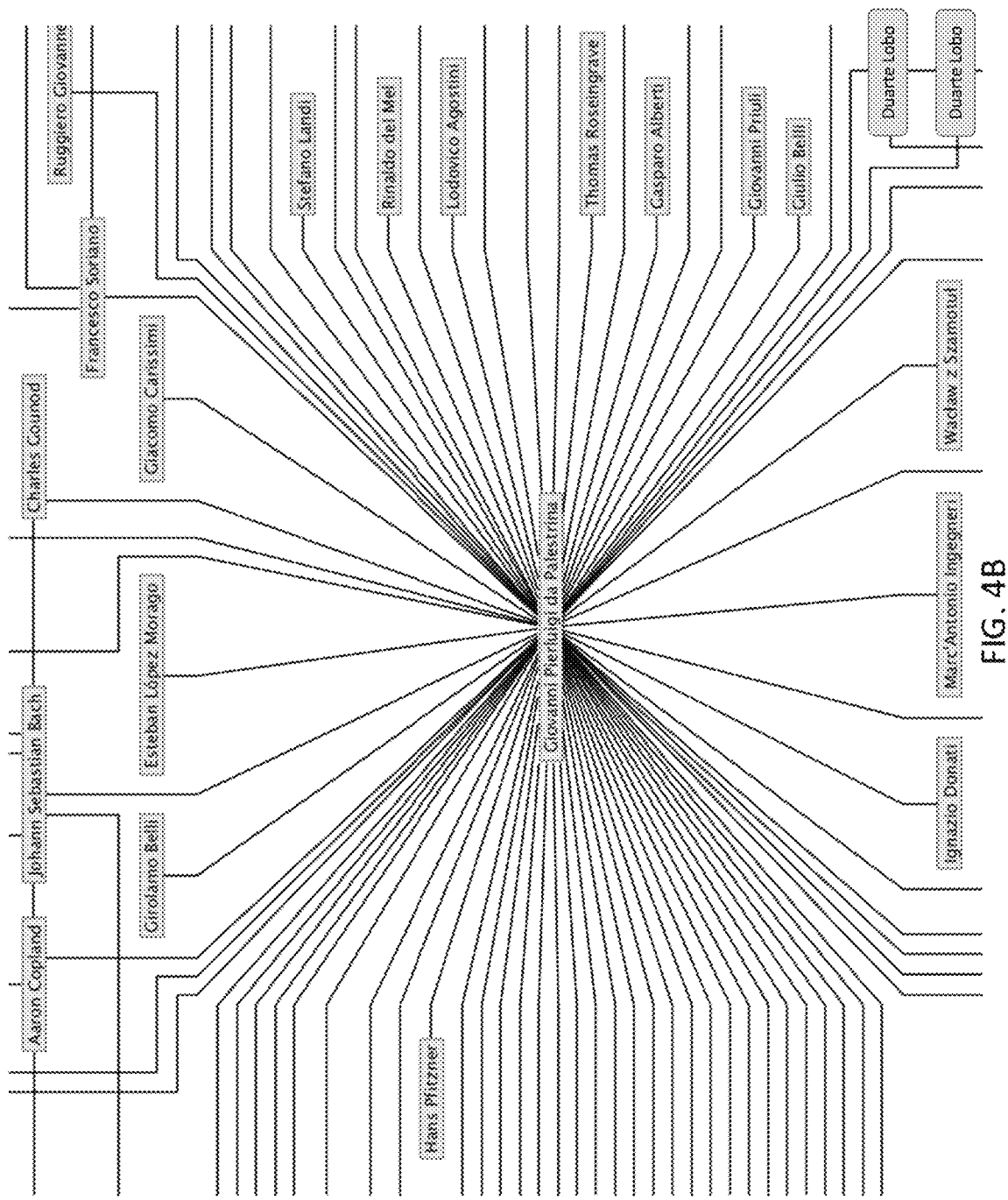
FIG. 4B is an example showing the same portion of the orthogonal graph drawing surrounding the high-degree node of FIG. 4A, wherein slope end routing has been used to maintain a fixed size of the node.
Figure 8A:
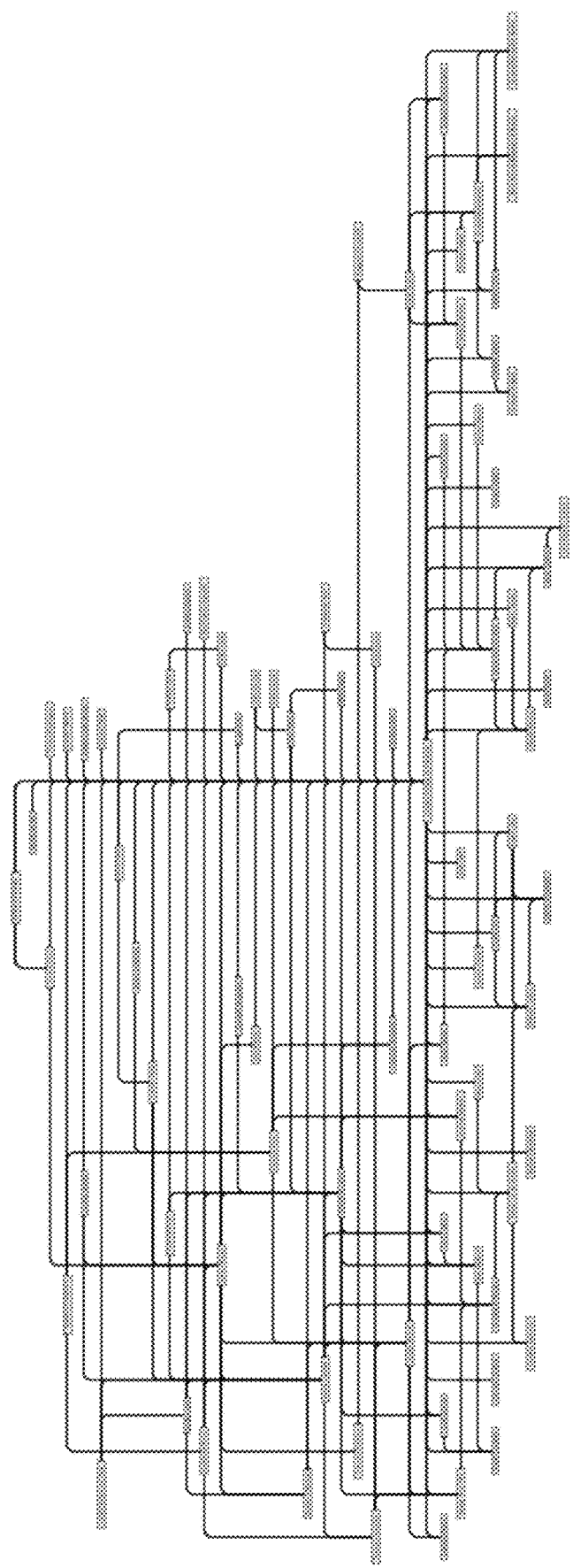
FIG. 8A is a graph drawing showing the same drawing as in FIGS. 1-3 laid out using the present method.

FIG. 8A shows the same drawing as in FIGS. 1-3 laid out using the proposed method. Despite the high density of the graph, individual edges are still easy to follow due to their simple and uniform paths and the overall tidiness of the drawing (compare the enlarged portion of the drawing in FIG. 8B with the straight-line drawing in FIG. 1). Also, because edges share their paths at common end nodes, high-degree nodes do not cause any local readability problems.

Figure 8B:
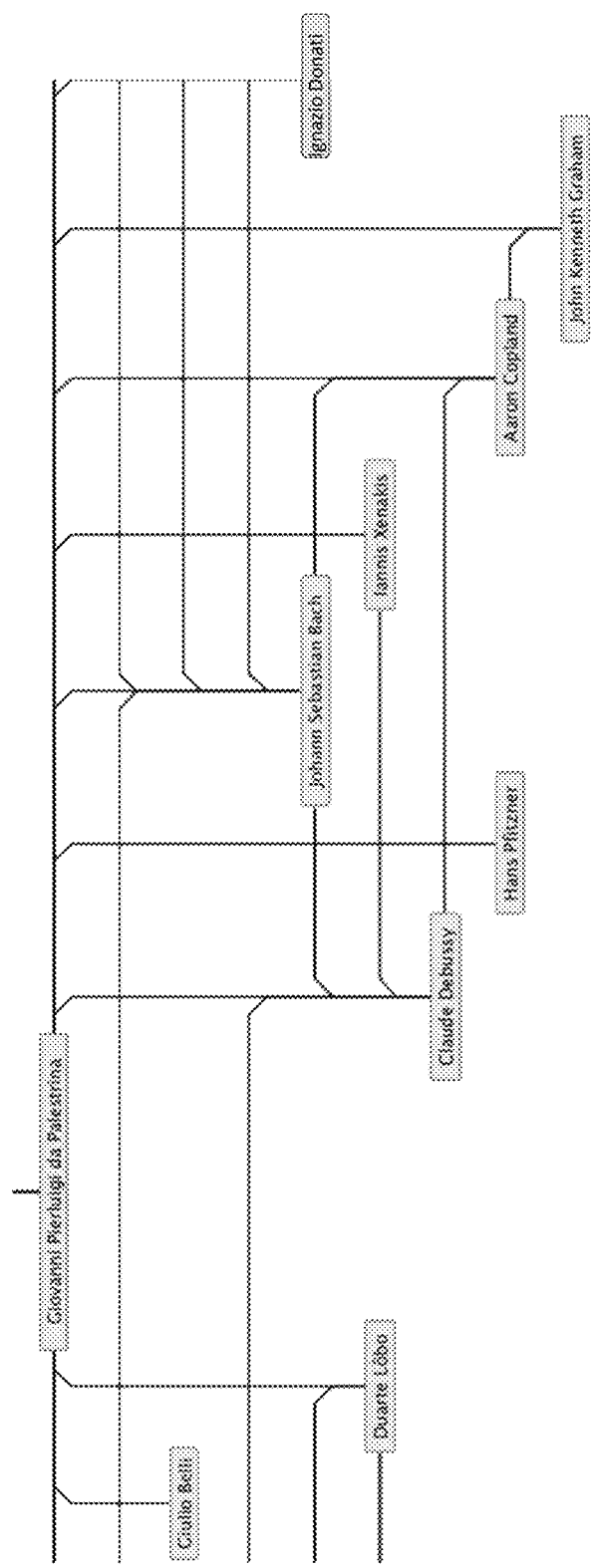
FIG. 8B is a graph drawing showing an enlarged portion of the drawing of FIG. 8A.

Referring to FIG. 8B, the manner in which drawn lines are shared between multiple edges while preserving readability and the ability to separately distinguish the multiple edges may be clearly observed. For example, the node labeled "Johann Sebastian Bach" has a drawn line extending vertically from the node. This single drawn line represents, in whole or in part, five different edges, as distinguished by the short 45-degree segments that depart from the line. Three of the 45-degree segments depart to the right, representing edges incident to other nodes, not shown. The upper of the two 45-degree segments departing to the left joins a horizontal drawn line that is incident to the node labeled "Giovanni Pierluigi de Palestrina." This horizontal drawn line completes the edge from the Bach node to the Palestrina node.

Aside from the initial node placement and sorting in steps 1-2, the method can be implemented in linear time with respect to the number of nodes and edges. If a linear time initial node placement is adopted that would produce grid coordinates without empty rows or columns and a bucket sorting of the nodes as in step 2 is applied, then the method as a whole becomes linear and can be applied to massive graphs.

Figure 7:
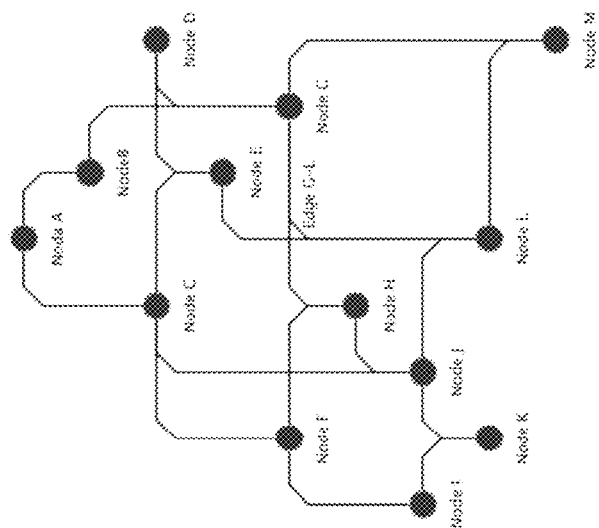
FIG. 7 is a graph like that of FIG. 6 in which nodes have been labeled in a space underneath each node that is void of edges, and an edge label is placed at the bend point of the corresponding edge.

Because of the way the edges are routed, the bottom side of each node is never occupied by edges, and thus it can be used for assigning labels to the nodes, as in FIG. 7. Edge labels can be placed at the unique bend points inside the 90-degree angle, as illustrated for the edge between nodes G and L in FIG. 7.

The foregoing methods may be used to render the edges of a drawing (e.g., a force directed drawing) so that they would be clearly readable. However, similar techniques may be used to draw graphs in new ways, without necessarily respecting the order obtained from force directed or other techniques.

Exemplary Hardware Environment

Figure 9:
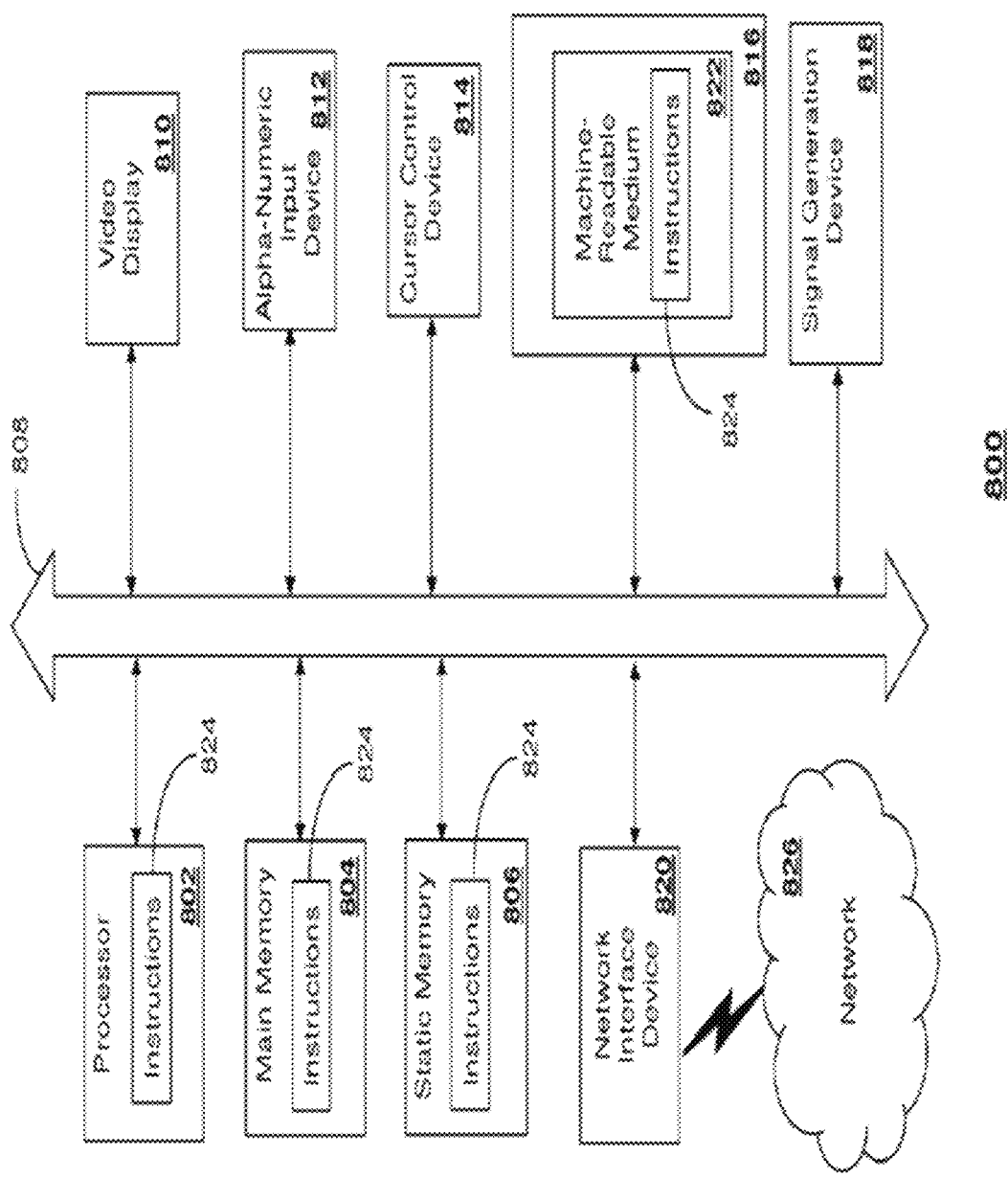
FIG. 9 is a diagram of a computer system with which the present invention may be used.

FIG. 9 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a mobile phone, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU)), a graphics processing unit (GPU, or both), a main memory 804, and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control), and a network interface device 820.

The disk drive unit 816 may include a computer-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application-specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations that include, but are not limited to, distributed processing or component/object distributed processing, parallel processing, or virtual machine processing can also be constructed to implement the methods described herein.

The present disclosure contemplates a machine-readable medium containing instructions 824, or that which receives and executes instructions 824 from a propagated signal so that a device connected to a network environment 826 can send or receive voice, video, or data to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Exemplary Flow Chart

In accordance with an exemplary embodiment, methods in accordance with the present disclosure may follow the steps shown in FIG. 9.

A computer-implemented method is provided of drawing a graph in which multiple nodes are connected by multiple edges, using a computer system in which a computer is coupled to the computer display, the computer including a processor and a memory (FIG. 8). In step 901, a representation is received of a graph having multiple nodes and multiple edges, in which positions of the nodes relative to one another have been previously determined. In step 903, the representation is modified so as to: 1) preserve the positions of the nodes relative to one another; and 2) simplify the visual representation of the graph by sharing drawn lines between different distinct edges in such a way as to enable the different distinct edges, despite such sharing, to still be recognized by a user. The graph may be an undirected graph. In one embodiment, the processor places the nodes in unique positions with integer coordinates.

Modifications

The foregoing methods may be augmented in order to allow the user to insert new nodes and edges associated with these nodes without disrupting the user's mental map. The placement of new nodes can be done in various ways.

One way is to place the new nodes in a barycentric fashion: in other words, on a point that is determined by the average of the x-coordinates of its neighbors, and the average of the y-coordinates of its neighbors. Examples of other methods of placing new nodes include, for example: (a) minimizing the ink needed to represent the newly inserted nodes; (b) inserting a node closer to its most important (e.g., most-connected) neighbor; (c) in a barycentric position of its most important neighbors (if there is more than one such neighbor).

The exact placement point, p, of a new node may be determined by computing the next larger integer of the average of the x and the average of they coordinates of neighboring (i.e., connected) nodes. Since this column and row is already occupied by another node, the insertion is accomplished by inserting a new column and row. This implies that the rest of the drawing is "pushed" to the right and up from the aforementioned point p (above) of the new node (i.e., all x coordinates that are larger than or equal to the new x coordinate are increased by one, and the same is done for ally coordinates that are larger than or equal to the new y coordinate). In addition, some compaction steps may need to be undone to ensure that the new edges are not crossing unrelated nodes.

This approach maintains the "mental map" of the user by leaving the original drawing (before the insertion) virtually unchanged.

The foregoing methods may be augmented in order to allow a user to remove a node and edges associated with this node without disrupting the user's mental map. This can be done by simply removing the node along with its incident edges and compacting the drawing if the row or column becomes empty.

It will be appreciated by those skilled in the art that the present invention may be embodied in other specific forms without departing from the spirit or essential character thereof. The foregoing description is therefore intended in all respects to be illustrative and not restrictive. The scope of the invention is indicated by the appended claims rather than the foregoing description, and all changes that come within the meaning and range of equivalents thereof are intended to be embraced therein.

What is claimed is:

1. A computer-implemented method of drawing a graph comprising a plurality of nodes connected by a plurality of edges, using a computer system comprising a computer display and computer coupled to the computer display and comprising a processor and a memory, the method comprising:

receiving a representation of a graph comprising a plurality of nodes and a plurality of edges, in which positions of the nodes relative to one another have been previously determined; and modifying the representation so as to:

1) preserve the positions of the nodes relative to one another; and
2) simplify the visual representation of the graph by sharing drawn lines between different distinct edges in such a way as to enable the different distinct edges, despite such sharing, to still be recognized by a user.

2. The method of claim 1, wherein the graph is an undirected graph.

3. The method of claim 1, comprising the processor determining unique positions of nodes and edge routes.

4. The method of claim 2, comprising the processor placing the nodes in unique positions with integer coordinates.

5. The method of claim 4, wherein placing comprises:
sorting x-coordinates and y-coordinates of the positions of the nodes previously determined in the representation of the graph; and
ranking the x-coordinates and the y-coordinates to determine new integer x- and y-coordinates for each node.

6. The method of claim 5, comprising placing each node is placed in a unique row and column such that no node shares a row or a column with any other node.

7. The method of claim 6, comprising drawing edges connecting the nodes, wherein the locations of the nodes connected by the edges completely determine how the edges are drawn.

8. The method of claim 7 comprising, for each edge connecting a first node at a lower y-coordinate to a second node at a higher y-coordinate:
drawing the edge following a route upwards from the first node on a vertical line at an x-coordinate of the first node until the y-coordinate of the second node is reached;
drawing a right or left turn in the edge and continuing the edge until it reaches the second node.

9. The method of claim 8, comprising disambiguating the correct turn direction of the edges using a drawing convention.

10. The method of claim 8, comprising disambiguating the correct turn direction of the edges by joining the vertical portion of an edge to the horizontal portion of the edge by a left curve or right curve depending upon the direction in which the edge turns.

11. The method of claim 6, comprising performing compaction of the graph drawing.

12. The method of claim 7, comprising routes the edges in such a way that leaves the bottom side of the nodes unoccupied, without connection to any edge.

13. The method of claim 12, comprising preferentially placing node labels at the bottom side of nodes.

14. The method of claim 12, comprising placing edge labels at unique bend points of the respective edges, wherein no two edges make the same turn at the same point.

15. The method of claim 8, comprising:
receiving user input; and
in response to the user input, inserting one or more new nodes and edges associated with these one or more new nodes;
wherein relative positions of nodes prior to the user input are preserved.

16. The method of claim 15, comprising placing the one or more new nodes in accordance with one of the following:
placing a new node on a point that is determined by the average of the x-coordinates of its neighbors, and the average of the y-coordinates of its neighbors;
placing a new node so as to minimize the ink needed to represent the newly inserted node;
placing a new node closer to its most important neighbor than to other neighbors;
placing a new node in a barycentric position of its most important neighbors.

17. The method of claim 15, comprising:
determining a placement point, p, of a new node by computing the next larger integer of an average of x and y coordinates of neighboring nodes; and
inserting a new column and row coinciding with the placement point p;
wherein the rest of the drawing is pushed to the right and up from point p.

18. The method of claim 8, comprising:
receiving user input; and
in response to the user input, removing a node and edges associated with the node by removing the row and column of the node along with its incident edges.

* * * * *